(12) United States Patent
Dougan et al.

(10) Patent No.: US 9,756,153 B2
(45) Date of Patent: Sep. 5, 2017

(54) METHOD FOR IMPROVING ACCURACY IN COMPUTATION OF ONE-WAY TRANSFER TIME FOR NETWORK TIME SYNCHRONIZATION

(75) Inventors: Cort Dougan, Austin, TX (US); Victor Yodaiken, Austin, TX (US)

(73) Assignee: FINITE STATE RESEARCH LLC, Austin, TX (US)

( * ) Notice: Subject to any disclaimer, the term of this patent is extended or adjusted under 35 U.S.C. 154(b) by 908 days.

(21) Appl. No.: 13/465,200

(22) Filed: May 7, 2012

(65) Prior Publication Data

US 2012/0311168 A1 Dec. 6, 2012

Related U.S. Application Data

(60) Provisional application No. 61/492,149, filed on Jun. 1, 2011.

(51) Int. Cl.
*G06F 15/16* (2006.01)
*H04L 29/06* (2006.01)
(Continued)

(52) U.S. Cl.
CPC ............ *H04L 69/28* (2013.01); *H04J 3/0664* (2013.01); *H04L 43/0858* (2013.01); *H04J 3/0667* (2013.01); *H04L 43/106* (2013.01)

(58) Field of Classification Search
CPC .............................. H04J 3/0664; H04J 3/0667
See application file for complete search history.

(56) References Cited

U.S. PATENT DOCUMENTS

| | | | |
|---|---|---|---|
| 5,566,180 A | 10/1996 | Eidson et al. | |
| 5,790,805 A * | 8/1998 | Bantum | H04J 3/0667 709/248 |

(Continued)

FOREIGN PATENT DOCUMENTS

| | | |
|---|---|---|
| CA | 2461472 A1 | 4/2003 |
| CN | 1561590 A | 1/2005 |

(Continued)

OTHER PUBLICATIONS

International Preliminary Report on Patentability and Written Opinion, in corresponding International Application No. PCT/US2012/039830, dated Dec. 12, 2013, 7 pages.

(Continued)

*Primary Examiner* — Noel Beharry
*Assistant Examiner* — Ruihua Zhang
(74) *Attorney, Agent, or Firm* — Rothwell, Figg, Ernst & Manbeck, P.C.

(57) ABSTRACT

A method for improving accuracy in the computation of a one-way transfer time between two networked devices. In one aspect, variability in time transfer latency that is caused by cache loading, data structure setup time, and scheduling variability in software is reduced by initiating a first sequence of loading data structures into cache and priming scheduling, and then initiating a second sequence of calibrating the timing of a subsequent synchronization message so that the completion of the first sequence occurs just in time for the reception of the synchronization message. The method is applicable for any network time synchronization protocol, including Network Time Protocol (NTP) and Precision Time Protocol (PTP).

13 Claims, 7 Drawing Sheets

(51) Int. Cl.
*H04L 12/26* (2006.01)
*H04J 3/06* (2006.01)

(56) References Cited

U.S. PATENT DOCUMENTS

| | | | |
|---|---|---|---|
| 6,252,445 B1 | 6/2001 | Eidson | |
| 6,278,710 B1 | 8/2001 | Eidson | |
| 6,370,159 B1 | 4/2002 | Eidson | |
| 7,411,915 B1 | 8/2008 | Spain et al. | |
| 7,668,151 B2 | 2/2010 | Ryu et al. | |
| 7,876,790 B2 | 1/2011 | Cho et al. | |
| 7,876,791 B2 | 1/2011 | Jung et al. | |
| 8,543,868 B2* | 9/2013 | Gyorffy | G06F 11/0709 709/224 |
| 2002/0039370 A1* | 4/2002 | Elliot | H04J 3/0697 370/503 |
| 2004/0249982 A1 | 12/2004 | Arnold et al. | |
| 2004/0258097 A1 | 12/2004 | Arnold et al. | |
| 2009/0276542 A1* | 11/2009 | Aweya et al. | 709/248 |
| 2010/0034103 A1* | 2/2010 | Froehlich et al. | 370/252 |
| 2011/0051754 A1* | 3/2011 | Lansdowne | H04J 3/0673 370/503 |
| 2012/0275501 A1* | 11/2012 | Rotenstein | H04J 3/0667 375/220 |
| 2014/0064303 A1* | 3/2014 | Aweya | H04J 3/0667 370/509 |

FOREIGN PATENT DOCUMENTS

| | | |
|---|---|---|
| DE | 10147422 A1 | 4/2003 |
| DE | 10229110 A1 | 4/2003 |
| EP | 1430627 B1 | 6/2004 |
| EP | 1430628 B1 | 6/2004 |
| WO | 03028258 A1 | 4/2003 |
| WO | 03028259 A1 | 4/2003 |

OTHER PUBLICATIONS

Supplementary European Search Report issued for EP 12793782.9 dated Jan. 29, 2015, 7 pages.
Communication under Rule 71(3) EPC Intention to Grant issued for EP 12793782.9 dated Dec. 16, 2015, 44 pages.

* cited by examiner

METHOD FOR IMPROVING ACCURACY IN COMPUTATION OF ONE-WAY TRANSFER TIME FOR NETWORK TIME SYNCHRONIZATION

CROSS-REFERENCE TO RELATED APPLICATIONS

The present application claims priority benefit under 35 U.S.C. §119(e) of U.S. Provisional Patent Application No. 61/492,149, entitled "Method For Improving Accuracy In Computation Of One-Way Transfer Time For Network Time Synchronization," filed Jun. 1, 2011, the contents of which are incorporated herein by reference in their entirety.

TECHNICAL FIELD

The present invention relates to a method for performing network time synchronization, and more particularly, for improving accuracy in the computation of a one-way transfer time between two networked devices.

BACKGROUND

Distributed transaction systems, particularly financial trading systems, require tightly synchronized times between servers. As an example, if the clock at server A is 2 milliseconds ahead of the clock at server B, and server A posts a price of $1 for stock S at time t+2 and server B posts a market price of $2 for stock S at time t+1, then the log shows the stock S as falling in price although the stock S was actually rising in price. Precise time synchronization is also needed in other distributed transaction systems, in telecommunications, in industrial control and in military equipment. There are a number of other applications where precise estimation of one way transfer time (i.e., one way network delay) is important. For example, a financial trading system may need to know how long ago an order or price data was sent from an exchange or other source.

Suppose site A sends a message M to site B containing the time of day according to the clock of A. For B to set its own clock to match, B must estimate how much time has passed between the moment that A calculated the time of day until the moment that B read the time of day from the message M. That is, if t microseconds are required for the transfer from message M from A to B, then B should read the time out of M and add t microseconds before setting its own clock. The delay t is conventionally referred to as the time transfer latency.

One method for estimating t is for B to request a time update by sending a request message R, for which a response is then generated by A and returned to B as message M. The elapsed time between request and response is the round trip time. If the network is symmetric, B can divide the round trip time by two to determine time transfer latency. A second method involves scheduling the transmission of M from A to B to happen at precise periodic intervals.

There are at least three network time synchronization protocols that are currently widely used for network time synchronization. The first is known as the Network Time Protocol (NTP). NTP is an industry standard for enterprise and other commodity computing applications. Nearly every consumer and enterprise personal computer (PC) and computer server includes an implementation of NTP. When using NTP, a client sends requests for time to a server, which sends the time as a response.

The Inter-Range Instrumentation Group (IRIG) STD 168-98 protocol is another client-server time protocol that has been used in military systems since the 1950s. IRIG requires special cabling.

The more recent IEEE 1588 Precision Time Protocol (PTP) is a client-server protocol that is generally driven by the server, which hosts a so-called "master clock." In a standard PTP time update, the master clock multicasts a Sync Message containing the time to a number of slave clocks residing at clients. After a short delay, the server transmits a follow-up message which contains the time that the Sync Message "hit the wire." To the extent that the time transfer delay is caused by transmission delays internal to the master clock and network contention (i.e., two or more simultaneous attempts to access a network resource), the slave clock can be set correctly using this information. If there are network devices such as switches and routers that can cause additional delay between the master and slave clocks, PTP anticipates that they will add information about those delays to the Sync Message in transit. Such devices are called "transparent clocks" in the PTP standard.

PTP also may rely on hardware timestamping in network interface devices. The idea is that the master clock network interface device will be able to inform the master clock of the precise time the Sync Message was transmitted—for use in the follow-up message—and that the slave clock's network interface device will record the time of arrival of the first bit of the Sync Message. This is done to eliminate software generated time transfer variability caused by delays in reading and timestamping the Sync Message.

PTP also has a second transaction type that is used to calculate round trip time, and this is driven by the slave clock (i.e., client). In this transaction, the client sends a Delay Request message to the master clock and receives a response that allows the client to compute round trip delay.

However, whether using NTP, IRIG, or PTP, there are multiple causes of variable time transfer latency, which introduces an error into the time calculation at the client. In some instances, the variability is caused by cache loading, data structure setup time, and/or scheduling variability in the software. In what follows, we call this variability "cold cache" delays, meaning to include both physical cache and other components mentioned above. In the past, common practice has been to estimate these asymmetries in the one-way delay times and build those numbers into the software/hardware, or allow the end user to adjust the values manually. This has meant that the end user would attempt to measure these delays, which is often difficult to do. Further, the end user would typically assume that these delays never changed, which is often not the case. Accordingly, there is a need for a method to reduce the uncertainty associated with these factors in calculating the transfer time.

SUMMARY

Particular embodiments of the disclosed solution provide methods for improving timing accuracy between two communication devices that are connected via a network. In one aspect, variability in time transfer latency that is caused by cache loading, data structure setup time, and scheduling variability in software is reduced by initiating a first sequence of loading data structures into cache and priming scheduling, and then initiating a second sequence of calibrating the timing of a subsequent synchronization message so that the completion of the first sequence occurs just in time for the reception of the synchronization message. The methods are applicable for any network time synchronization protocol, including Network Time Protocol (NTP) and Precision Time Protocol (PTP).

In one particular aspect, a method for improving timing accuracy is provided. The method comprises: transmitting, at a time t, a first message from a first communication device to a second communication device via a network; transmitting, no earlier than at a time t+d, a second message from the first communication device to the second communication device via the network, wherein d is a predetermined interval; receiving, at the first communication device, a response to the second message; determining an amount of time that has elapsed from transmission of the second message to reception of the response to the second message; using the determined amount of time to calculate a transfer time between the first communication device and the second communication device; and synchronizing the first communication device to the second communication device based on the calculated transfer time.

In some embodiments, the method may further comprise receiving, at the first communication device, a response to the first message; and discarding the received response to the first message. The interval d may be determined based on estimating an amount of time that the second communication device uses to process the first message. Each of the first and second communication devices may be configured to use Network Time Protocol (NTP) for network time synchronization or the Precision Time Protocol (PTP) for network time synchronization. In the case of the Precision Time Protocol, the client (also known as a "slave") sends two delay request messages, discarding the response to the first one.

In another aspect, a method for improving timing accuracy in a network is provided. The network includes a client device and a server device in communication with the client device via the network. The server device is configured to transmit a synchronization message to the client device at a predetermined time t, for example as in the Precision Time Protocol (PTP). The method comprises: transmitting, at a time that is earlier than t but not earlier than t−d, from the client device to the server device, a delay request message, wherein d is a predetermined interval; receiving, at the client device, a response to the delay request message; ignoring this response value; using the synchronization message sent at time t to calculate a transfer time between the client device and the server device; and synchronizing the client device to the server device based on the calculated transfer time. In this method, the message sent by the server at time t will not be as subject to the cold cache problem and will show reduced transfer time variability.

In some embodiments, the interval d may be determined based on estimating an amount of time that the server device uses to generate and transmit the synchronization message. The client can then adjust this interval d to make sure that the delay request message and its response are sufficiently close in time to the generation and transmission of the synchronization message to keep important data structures in memory and otherwise improve performance of the transmission from the server. Each of the client device and the server device may be configured to use Precision Time Protocol (PTP) for network time synchronization.

In yet another aspect, a method for improving timing accuracy in a network is provided. The network includes a server device, a first client device, and a plurality of second client devices. Each of the first and second client devices is in communication with each other and with the server device via the network. The server device is configured to transmit a synchronization message to each of the first and second client devices at a predetermined time t. The method comprises: transmitting, at a time that is earlier than t but not earlier than t−d, from the first client device to the server device and to each of the second client devices, a dummy message, wherein d is a predetermined interval; receiving, at the first client device, the synchronization message; using the received synchronization message to calculate a transfer time between the first client device and the server device; and synchronizing the first client device to the server device based on the calculated transfer time. In this embodiment, the use of multicast messages in a protocol like PTP means that multicast messages can also be generated by the first client (slave) device and those messages can be received by all other clients (the second client devices) in order to clear cold cache issues in those clients.

In some embodiments, the interval d may be determined based on estimating an amount of time that the server device uses to generate and transmit the synchronization message. Each of the server device and the first and second client devices may be configured to use Precision Time Protocol (PTP) for network time synchronization. In this embodiment, the first client (slave) device estimates the most advantageous delay "d" to send the dummy message in order to be sure to optimally avoid cold cache problems in itself and in the second client devices.

In still another aspect, a method for improving timing accuracy between a server device and a client device is provided. The method comprises: transmitting, at a time t, a first synchronization message from the server device to the client device via a network; and transmitting, no later than at a time t+d, a second synchronization message from the server device to the client device via the network. The quantity d is an interval that is determined such that the client device is caused to discard the first synchronization message and to use the second synchronization message for calculating a transfer time between the server device and the client device. The client device is then synchronized to the server device based on the calculated transfer time. Each of the client device and the server device may be configured to use Precision Time Protocol (PTP) for network time synchronization. In this embodiment, the server device, not the client device, is responsible for sending a message that warms the cache of the client (slave) devices.

In yet another aspect, a method for improving timing accuracy in a network is provided. The network includes a client device and a server device in communication with the client device via the network. The server device is configured to transmit a synchronization message to the client device at a predetermined time t. The method comprises: estimating a one-way transfer time T for the synchronization message to propagate from the server device to the client device; determining an interval d such that a cache remains populated for no less time than d; causing the server device to populate caches stored in the server device prior to t but no earlier than t−d; causing the client device to populate caches stored in the client device prior to t+T but no earlier than t+T−d; and synchronizing the client device to the server device based on the synchronization message. Each of the client device and the server device may be configured to use Precision Time Protocol (PTP) for network time synchronization. In this aspect, the devices act directly to populate caches instead of sending messages that cause the caches to be populated as a side effect.

In still another aspect, a method for improving timing accuracy in a network is provided. The network includes a client device; a network interface device; and a server device in communication with the client device via the network interface device. The method includes receiving, at the client device, a first message. The first message includes information relating to a second message to be transmitted by the server device to the client device at time t. Then, the client device transmits a polling message to the network interface device at a time that is earlier than t but not earlier than t−d, wherein d is a predetermined interval. The client device then receives the second message, and uses the second message to calculate a transfer time between the client device and the server device. The client device is then synchronized to the server device based on the calculated transfer time. The interval d may be determined based on estimating an amount of time that the server device uses to generate and transmit the second message. Each of the client device and the server device may be configured to use Precision Time Protocol (PTP) for network time synchronization.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
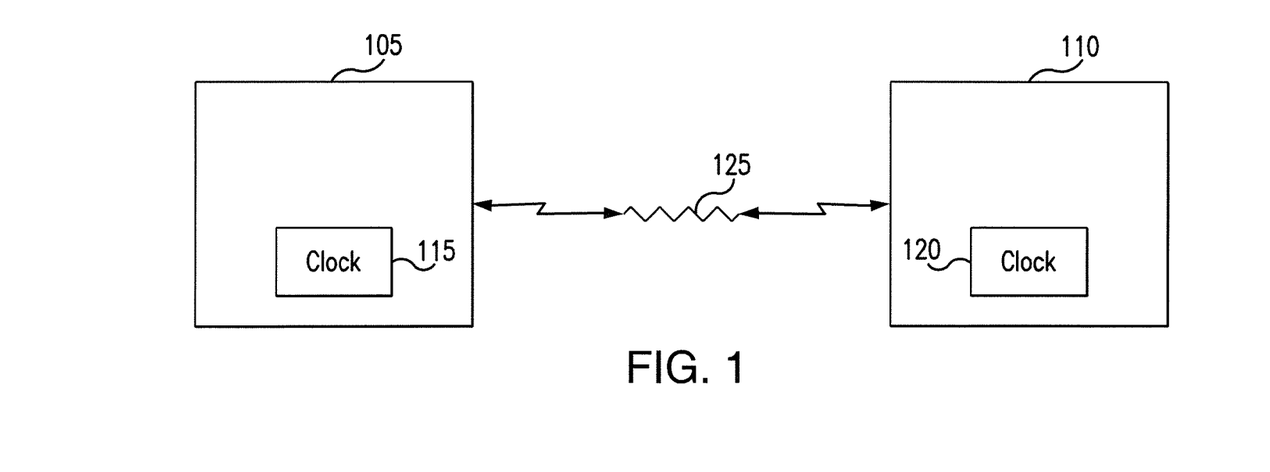
FIG. 1 illustrates a connection between a first communication device and a second communication device using a network in accordance with exemplary embodiments of the present invention.
Figure 2:
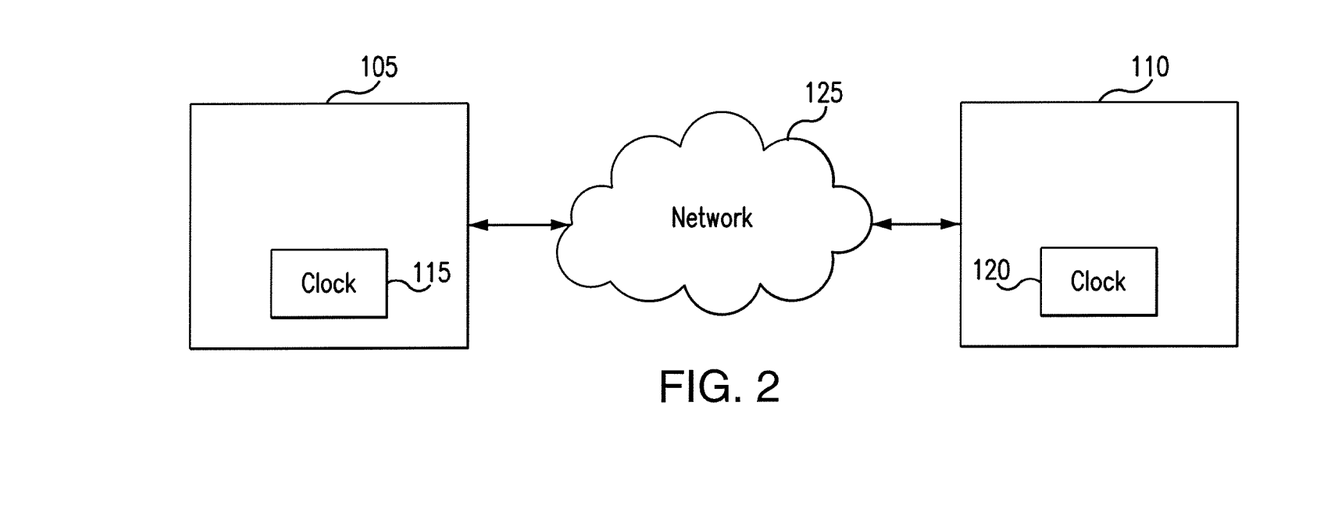
FIG. 2 illustrates a network connection between a first communication device and a second communication device in accordance with exemplary embodiments of the present invention.

Referring now to FIG. 1, the present inventors have devised a methodology for improving the accuracy of the calculation of the one-way transfer time between a first communication device 105 and a second communication device 110 that are connected, wired or wirelessly, to one another, directly or indirectly through, for example, a network or the like 125. The calculation of the one-way transfer time is important for enabling the first communication device 105 to synchronize its internal clock 115 to the internal clock 120 of the second communication device 110. Referring also to FIG. 2, the methodology improves the accuracy of this calculation by reducing the uncertainty in transfer time, which is the time it takes a message to traverse a network 125 from the first communication device 105 to the second communication device 110.

Figure 3:
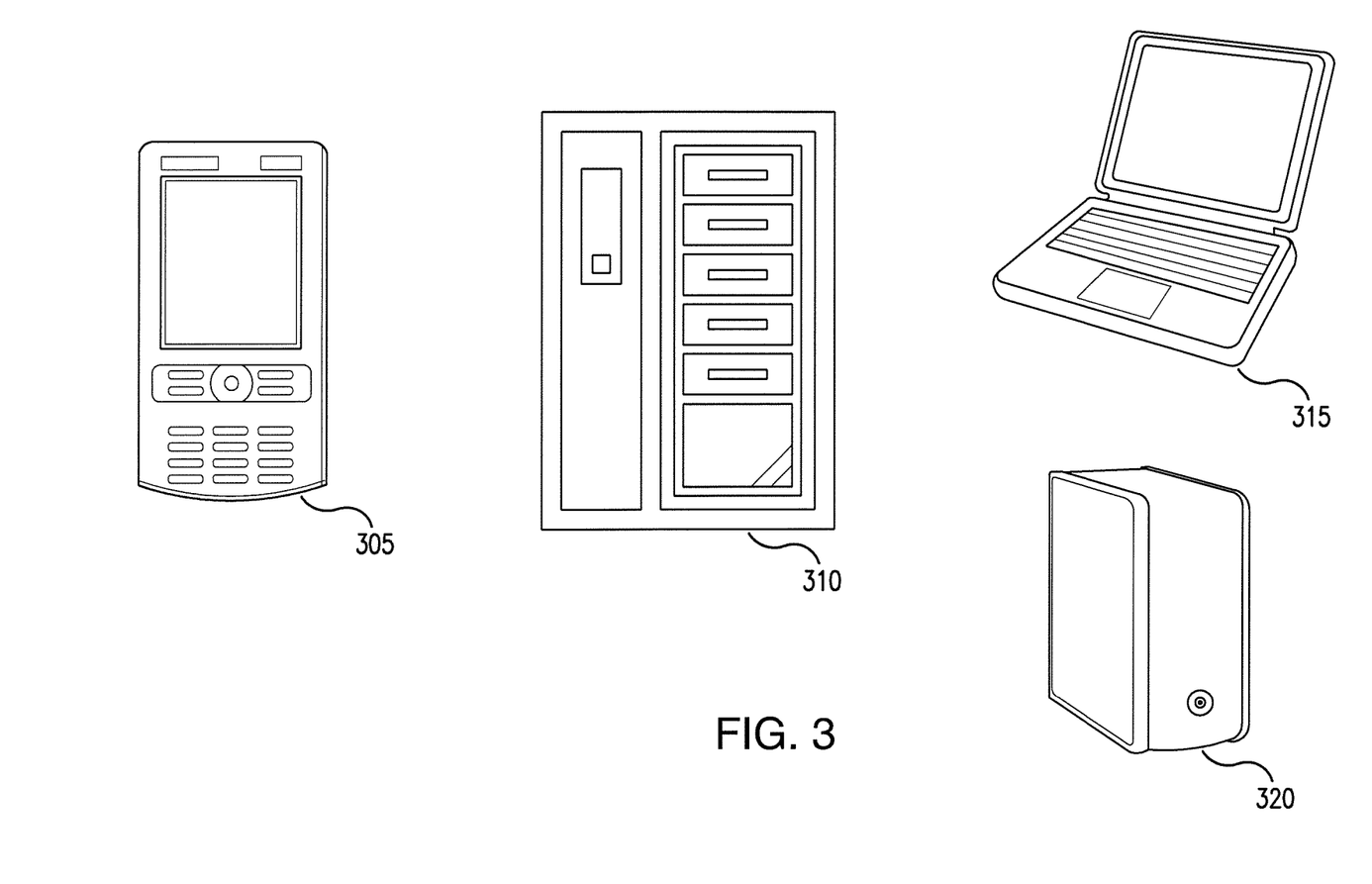
FIG. 3 illustrates examples of communication devices for use in communicating using the network connection of FIG. 2.

Referring to FIG. 3, the methodology is applicable to any type of device that can be configured to communicate via a network, including, for example, a mobile device 305 such as a wireless telephone, a personal digital assistant, an electronic reader (e.g. an Amazon Kindle), or a personal tablet computer (e.g., an Apple iPad); a server computer 310; a laptop computer 315; and a personal computer 320.

Figure 4:
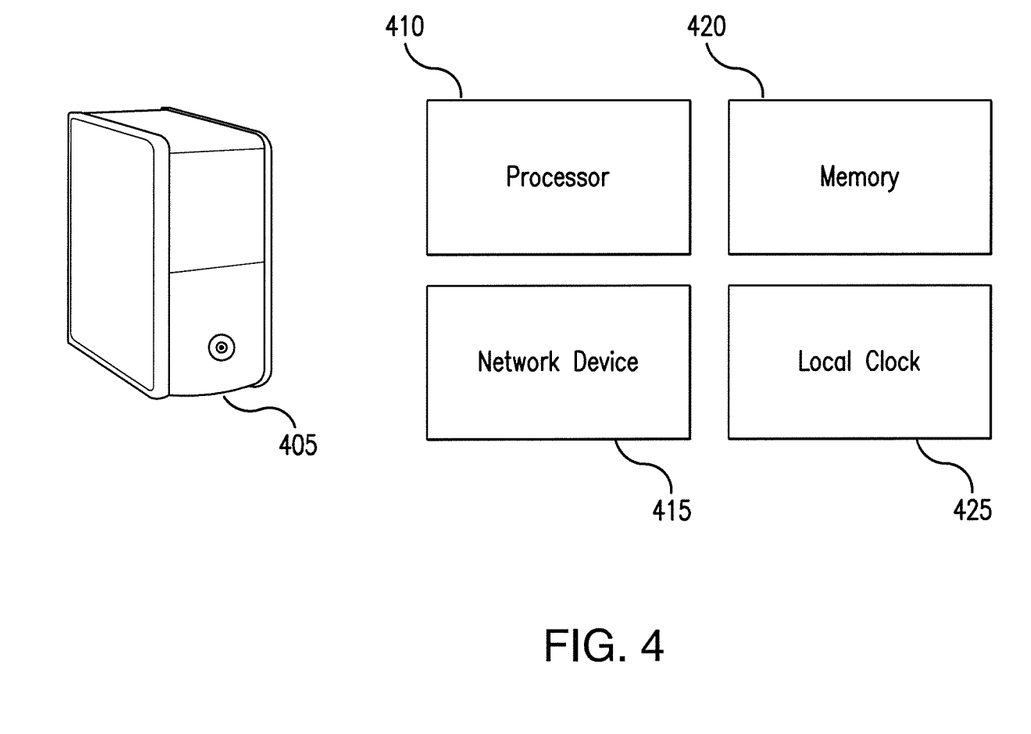
FIG. 4 is a block diagram of component elements of a communication device used for communicating using the network connection of FIG. 2.

FIG. 4 illustrates a block diagram of an exemplary communication device 405. Referring now to FIG. 4, the communication device 405 may include a processor 410, a network interface device 415, memory 420, and a local clock 425. Computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the processor 410 to perform steps described below (e.g., steps described below with reference to the flow charts shown in FIGS. 7-10). In other embodiments, the communication device 405 is configured to perform steps described below without the need for code. That is, for example, processor 410 may consist of one or more ASICs. Hence, the features of the present invention described herein may be implemented in hardware and/or software. For example, in particular embodiments, the local clock 425 may be implemented as hardware or software, or by any suitable combination of hardware and/or software.

Figure 5:
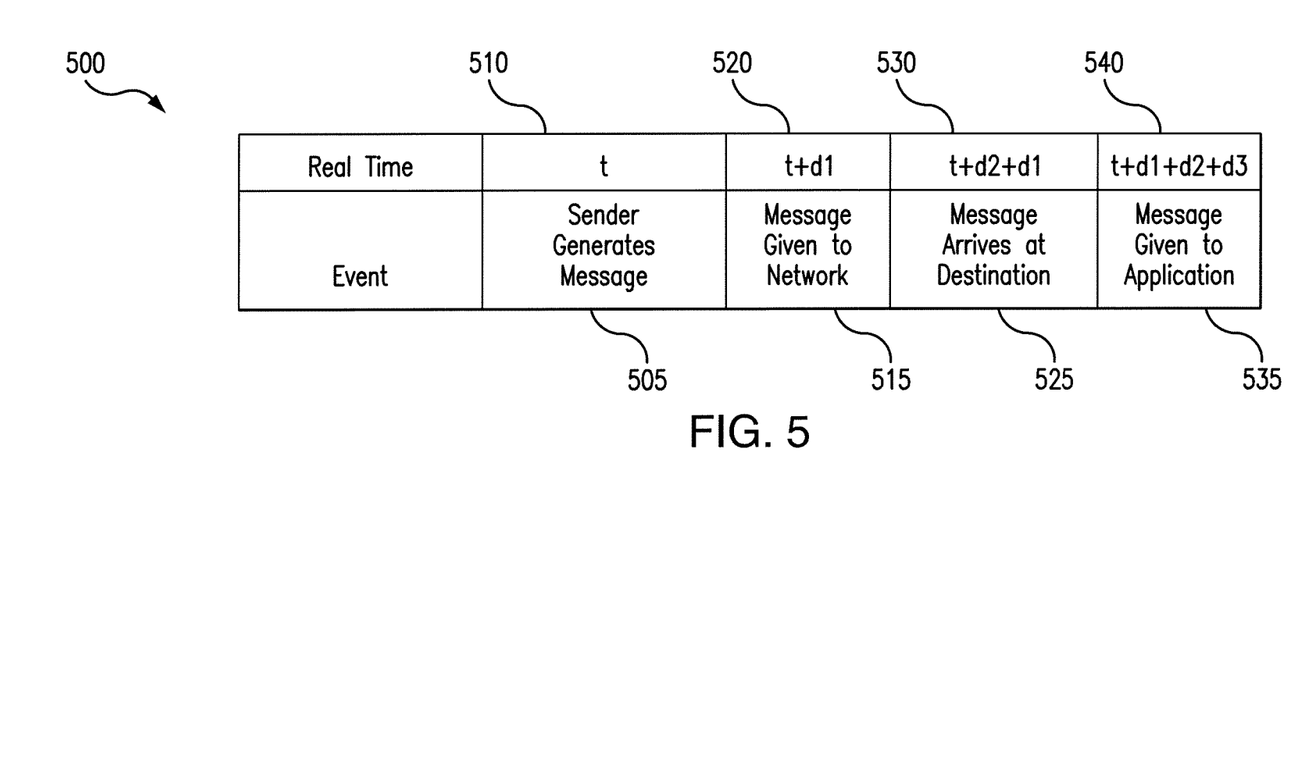
FIG. 5 illustrates a first exemplary sequence of events used for determining a one-way transfer time in accordance with exemplary embodiments of the present invention.

Referring now to FIG. 5, a first exemplary sequence of events 500 used for determining a one-way transfer time is illustrated. First, at 505, a sender, such as, for example, a server computer, generates a message at time t 510. At 515, the generated message is then submitted to a network for transmission at time t+d1 520—i.e., d1 is equal to the amount of time required for the server to submit the generated message to the network. The message is then transmitted by the network at 525 to a destination, such as, for example, a client computer. The transmission time is equal to d2. Accordingly, the message arrives at the destination at time t+d1+d2 530. Finally, at 535, the message is submitted to an application for processing at time t+d1+d2+d3 540, where d3 is equal to the delay associated with submitting the received message to the application. Thus, the cumulative delay, i.e., the one way transfer time, associated with transmitting the message from the source to the destination is equal to d1+d2+d3. The one way transfer time is then used to synchronize the client computer (i.e., the destination) to the server computer.

Figure 6:
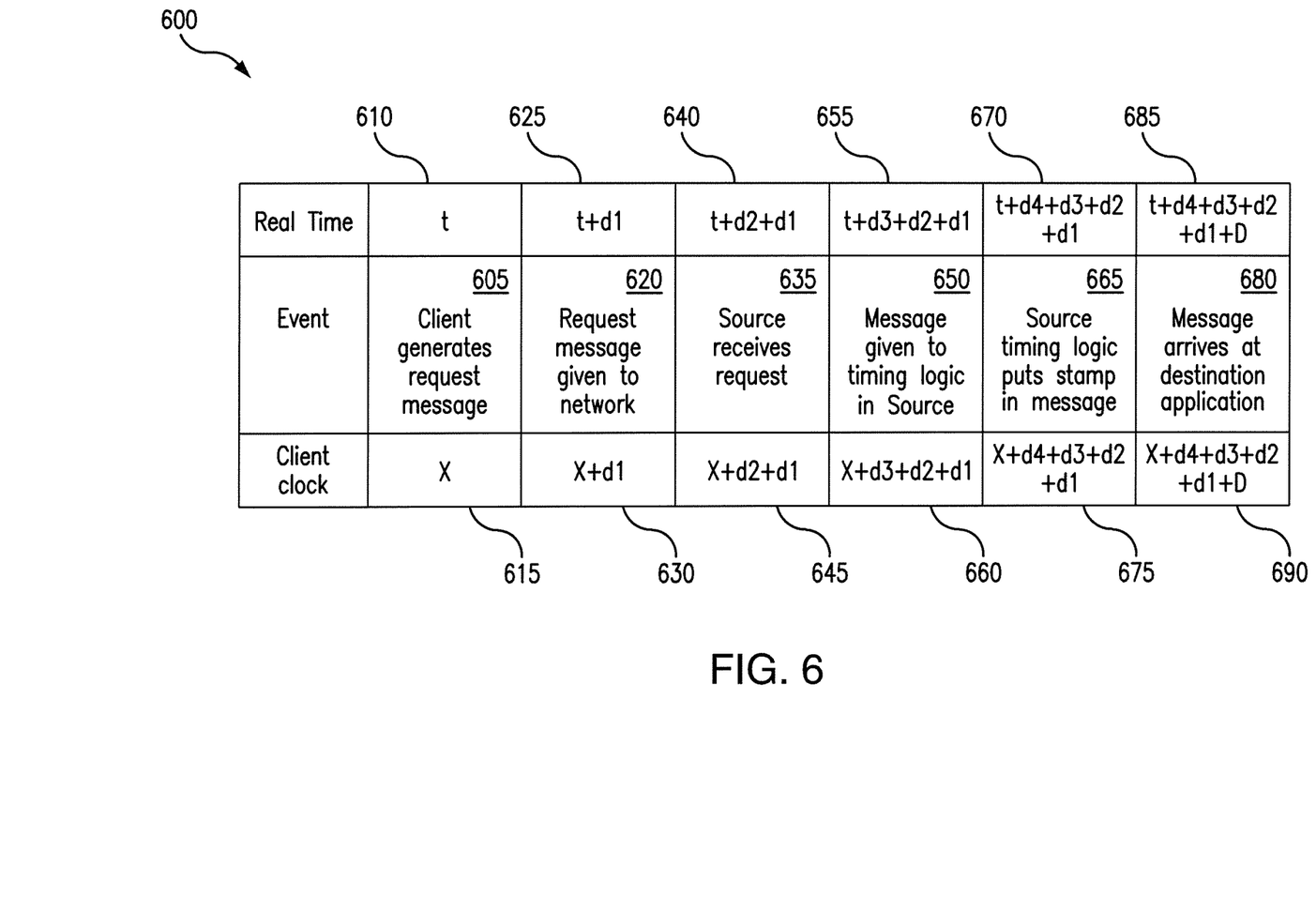
FIG. 6 illustrates a second exemplary sequence of events used for determining a one-way transfer time in accordance with exemplary embodiments of the present invention.

Referring now to FIG. 6, a second exemplary sequence of events 600 used for determining a one-way transfer time is shown. In this second sequence, a request message is transmitted and a response message is received from the same communication device, such as, for example, a client computer, thereby encompassing a round-trip (i.e., two-way) transfer. The client computer initiates this sequence at 605 by generating a request message at time t 610, which is equivalent to time X 615 as indicated on the clock residing in the client computer. At 620, the client computer then submits the request message to the network for transmission to the server computer, which acts as a source for setting the clock. The delay associated with submitting the request message to the network is equal to d1; therefore, the time at which this event occurs is equal to t+d1 625, which is equivalent to X+d1 630 on the client clock.

The message is then transmitted to the server at 635. The transmission time is equal to d2. Accordingly, the server receives the request at time t+d1+d2 640, which is equivalent to X+d1+d2 645 on the client clock. Then, at 650, the server submits the received request message to its internal processor, with an associated delay of d3. Thus, the submission time is t+d1+d2+d3 655, and the equivalent client clock time is X+d1+d2+d3 660. The server processor then uses a resident timing logic routine to execute the request at 665, and the execution is completed by recording a time stamp in a response message. The delay associated with the execution is equal to d4, which yields a real time of t+d1+d2+d3+d4 670 and a client clock time of X+d1+d2+d3+d4 675. Finally, at 680, the response message is transmitted to the client, with an associated transmission time of D. Accordingly, the client receives the response message at time t+d1+d2+d3+d4+D 685, which is equivalent to X+d1+d2+d3+d4+D on the client clock 690.

Therefore, the cumulative delay associated with the entire second sequence is equal to d1+d2+d3+d4+D, which is equal to a round-trip, two-way transfer time. Accordingly, the client can estimate that the one-way transfer time is equal to half of this cumulative two-way delay, i.e., (d1+d2+d3+d4+D)/2, based on the assumption that the one-way transfer time from client to server is equal to the one-way transfer time from server to client. This assumption is valid insofar as the processing times on each end of the transmission are consistent. However, as discussed above, variability on either end may be caused by cache loading, data structure setup time, and scheduling variability in the software. The methodology described herein is designed to address this variability.

There are a number of uses for this methodology, but the most immediate application is to improve clock synchronization between two computing devices. In particular, the method is applicable to both common time synchronization protocols: the Network Time Protocol (NTP) and the IEEE 1588 Precision Time Protocol (PTP). The methodology is efficient, effective, and easily adaptable to different protocols, operating systems, networks, and network drivers.

In a preferred embodiment, the methodology relies on executing "dummy" network transactions just prior to a real transaction in order to reduce uncertainty and/or error in time transfer calculation caused by cache, memory allocation, scheduling, and other software/hardware variability. In this aspect, the methodology relies on the use of optimized time synchronization software that has successfully reduced the effects of other significant causes of timing error in conventional devices. Without such optimization, the effects of the present methodology may be difficult to observe, because the timing error corrections produced by this methodology are generally less than one millisecond.

The methodology described here reduces variability in time transfer latency via two sequences of steps. The first sequence brings key data structures into cache and primes scheduling. The second sequence calibrates the timing of the first sequence so that it completes just in time for the actual synchronization message from which the one way transfer time calculation is made.

In one aspect, the method entails executing synchronization code and then discarding the result just before synchronization code is run to adjust time so that the execution paths have been exercised, caches are filled, data structures are initialized and allocated, and the threads of execution that handle the timing messages have been activated and scheduled. Alternatively, the execution of the code need not be performed if the processor is able to prefetch memory into the cache, thereby obtaining the same effect.

Figure 7:
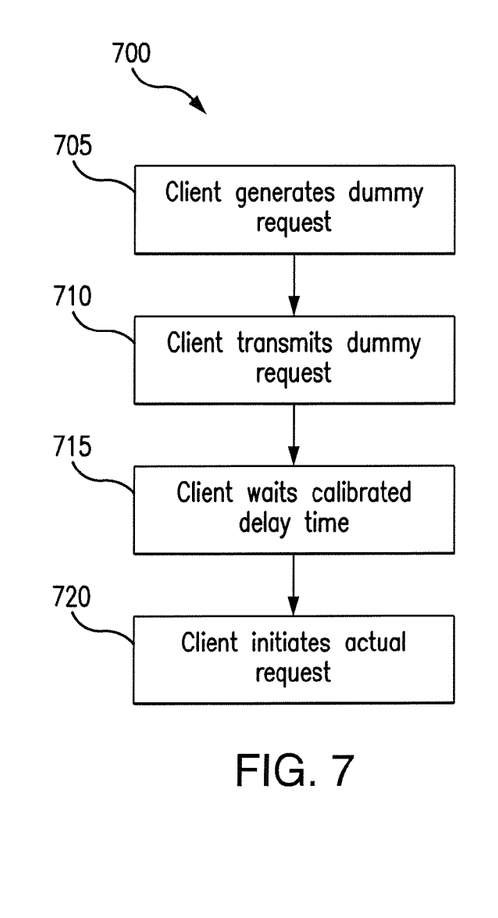
FIG. 7 is a flow chart illustrating a first method for improving the accuracy of the calculation of one-way transfer time, in accordance with exemplary embodiments of the present invention.

Referring now to FIG. 7, a flow chart 700 illustrates a method for improving the accuracy of the calculation of one-way transfer time according to a first exemplary embodiment of the invention. In this embodiment, preferably the client device employs the NTP protocol. NTP is client driven; therefore, only the client needs to be aware of this technique and only the client needs to implement the method. In the first step 705, the client generates a dummy synchronization request, which is identical in structure to a standard synchronization request. Then, at 710, the client transmits the dummy request to the server. Third, at 715, the client waits for a calibrated delay time that is deliberately timed such that the server will receive a subsequent synchronization request while the server caches are still populated from the processing of the dummy request. Fourth, at 720, the client initiates the actual (i.e., subsequent) synchronization request, which is also identical in structure to a standard synchronization request. The server receives the actual request with the caches already pre-populated from the previous dummy request and responds to the client. The client receives the response from the actual request and then processes the response and uses it for synchronization. Accordingly, the client simply discards the result of the dummy request. As part of this first exemplary embodiment of the invention, the correct interval between two requests is calibrated such that the server caches remain pre-populated and the server scheduling remains primed when the second synchronization request is received.

Figure 8:
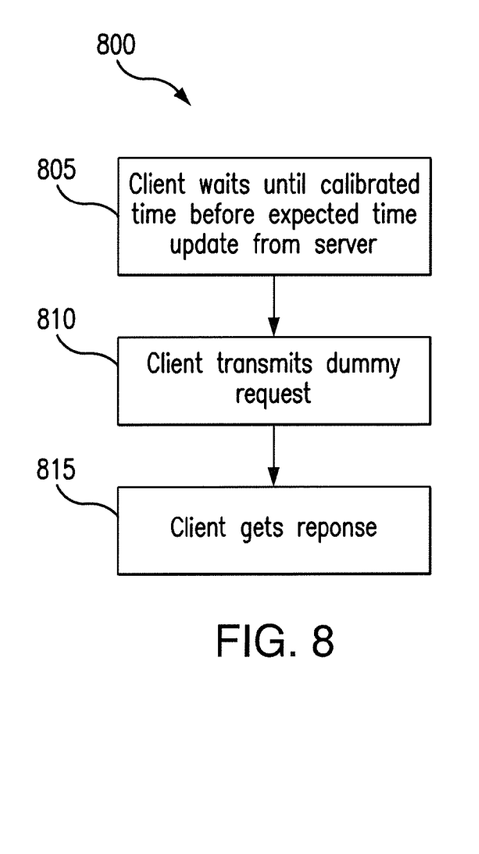
FIG. 8 is a flow chart illustrating a second method for improving the accuracy of the calculation of one-way transfer time, in accordance with exemplary embodiments of the present invention.

Referring now to FIG. 8, a flow chart 800 illustrates a method for improving the accuracy of the calculation of the one-way transfer time according to a second exemplary embodiment of the invention. In this embodiment, preferably the client device employs the PTP protocol. The PTP client can negotiate with the server to deliver synchronization messages at known intervals, or use the interval provided by the server (i.e., master clock) by default. Using this technique, the server is prompted to deliver those synchronization messages at a very specific interval, thereby allowing the client to determine approximately when the next synchronization message will be received. Accordingly, in the first step 805 of the method, the client waits until a calibrated time prior to the time at which the regular synchronization message is expected to be received. Then, at 810, the client generates a dummy synchronization message and transmits this dummy message to itself shortly before the synchronization message from the server arrives. In this manner, the client causes its own caches to be filled and its scheduling to be primed in advance of the receipt of the regular synchronization message from the server. Last, at 815, the client receives the actual synchronization message, and uses this message for calculating the one-way transfer time. Calibration may be used to determine the interval between the dummy transmission and the expected receipt of the synchronization message from the server, as discussed further below with reference to FIG. 10.

In an alternative embodiment of the method illustrated in FIG. 8, the client generates and transmits a delay request message to the server shortly before the server is expected to send a synchronization message to the client. In this manner, the client is able to manipulate the server remotely to get more deterministic behavior from the server by causing it to pre-populate its caches and exercise the code paths that the server will use to send out the synchronization message, thereby reducing variability on both the server and the client because the code paths on both will have been exercised.

In another alternative embodiment, a method for improving the accuracy of the calculation of the one-way transfer time may be implemented by a client that preferably uses the PTP protocol to improve synchronization between the client and the server, and also to improve synchronization between the server and other clients. First, the client waits until shortly before a synchronization message is expected to be transmitted by the server. At that time, the client transmits a broadcast synchronization message that is received by every client, including those not implementing this technique. The broadcast synchronization message is filled with data that causes it to be discarded by each client and not used as a genuine synchronization message. This can be accomplished by populating the broadcast synchronization message with invalid data, transmitting the broadcast synchronization message to a different PTP domain, or by using other techniques. The receipt of the broadcast synchronization message then causes each non-implementing client to process the message and exercise the code/hardware path that will also be used to process the soon-to-arrive synchronization message from the server that will actually be used for synchronization.

Figure 9:
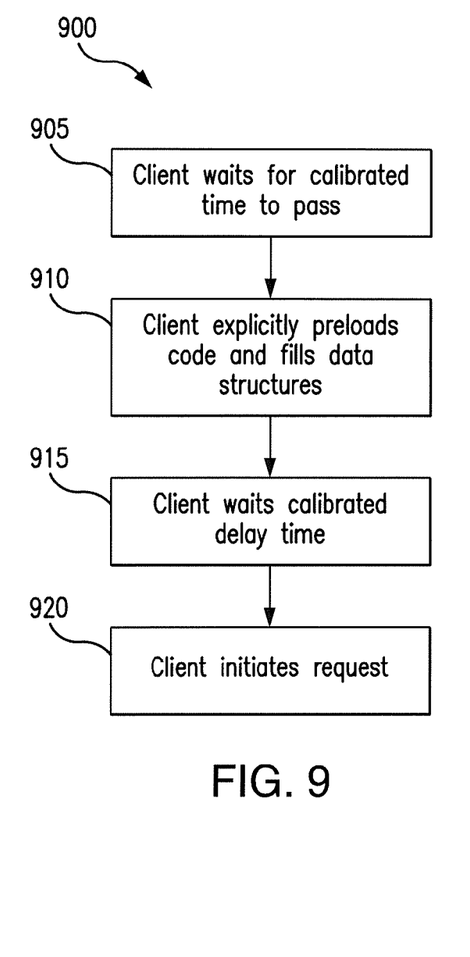
FIG. 9 is a flow chart illustrating a third method for improving the accuracy of the calculation of one-way transfer time, in accordance with exemplary embodiments of the present invention.

Referring to FIG. 9, a flow chart 900 illustrates a method for improving the accuracy of the calculation of the one-way transfer time according to a third exemplary embodiment of the invention. In this method, the client first waits for a calibrated time to pass at 905, and then, at 910, the client explicitly preloads code and fills data structures in its own hardware. The client then waits for a calibrated delay time at 915, and then, at 920, initiates a synchronization request to the server. The response to this request is used to determine the one-way transfer time with greater accuracy due to the preloading of the code and data structures.

In an alternative embodiment, a method for implementation by the server in a PTP environment is described. In this case, the server sends out a synchronization message that is processed by the client. The server then immediately follows up with another synchronization message. The first message received by the client is likely to reflect a greater variation in transfer time than the second received message; accordingly, the client may discard the first received message and use the second received message for calculation of transfer time.

In another alternative embodiment, a method is designed to take advantage of the fact that the server and client are using the same time base once they are synchronized to a reasonable level of accuracy (a coarse-grained accuracy). To further refine the accuracy, the server and client can establish a window in which the time synchronization will occur so that both server and client are prepared for the exchange and all caches can be populated ahead of time, and intermediate switched and networking equipment can also be prepared for the exchange (e.g., transparent clocks for PTP; for NTP, networking equipment that is NTP-protocol-aware can implement this technique).

Networking equipment for which this technique is implemented does not need to communicate with a server or client, and neither the server nor the client needs to be aware that the networking equipment is using this technique, if the equipment is configured to simply observe patterns in the traffic and takes advantage of the fact that the synchronization messages are being transmitted on a very fixed schedule, even when the server and/or the client is not using the technique directly.

In another embodiment, the priming operation may be executed in a network router, a network switch, and/or one or more network interface devices without requiring collaboration of server or client. For example, the network interface card can execute a variation of the standard algorithm with a time packet marked as invalid in some way.

Figure 10:
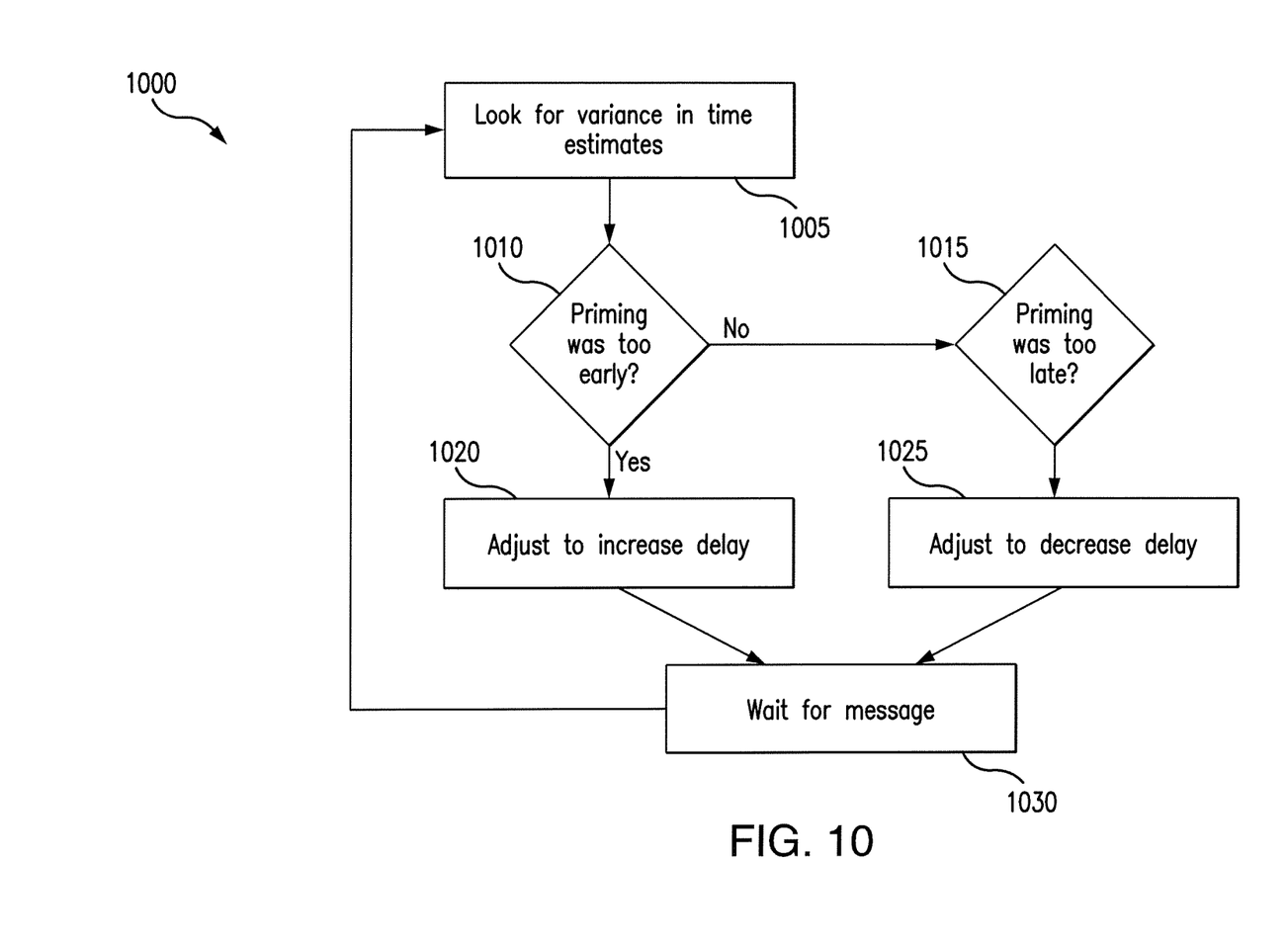
FIG. 10 is a flow chart illustrating a process for calibrating a delay time that may optionally be used in the methods illustrated in FIGS. 7, 8, and 9, in accordance with exemplary embodiments of the present invention.

Referring now to FIG. 10, a flow chart 1000 illustrates a process for calibrating a delay time used in the methods described above. As described above, the methods rely upon transmitting a message at a carefully calibrated time such that the caches are populated and the code paths are exercised at the time of receipt of the message. Accordingly, the effectiveness of the technique relies upon a relatively precise calibration. In this regard, the client can continually monitor the transfer times to determine whether there is consistency in the calculations. Ideally, if the transmission times are always selected properly, then the calculated transfer times should be relatively consistent, whereas if the transmission time is too early or too late, then the calculated transfer times may tend to have a greater variance. Thus, in the first step 1005, the client detects a variance in the time estimates, and based on this variance, a determination is made as to whether the priming process was executed too early at 1010 or whether the priming process was executed too late at 1015. If the priming process is determined to have been executed too early, then an adjustment to increase the delay is made at 1020. If the priming process is determined to have been executed too late, then an adjustment to decrease the delay is made at 1025. The client then performs the method again using the newly calibrated delay by waiting for a new message at 1030, and then returns to the first step to check whether the transfer times are becoming more consistent.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for improving timing accuracy, comprising:
   transmitting, at a time t, a first message from a first communication device to a second communication device via a network;
   transmitting, no earlier than at a time t+d and before receiving a response to the first message, a second message from the first communication device to the second communication device via the network, wherein d is a delay time interval greater than zero and is based on estimating an amount of time that the second communication device uses to submit the first message to an application for processing;
   receiving, at the first communication device, a response to the second message;
   determining an amount of time that has elapsed from transmission of the second message to reception of the response to the second message;
   using the determined amount of time to calculate a transfer time between the first communication device and the second communication device; and
   synchronizing an internal clock of the first communication device to an internal clock of the second communication device based on the calculated transfer time.

2. The method of claim 1, further comprising:
   receiving, at the first communication device, a response to the first message; and
   discarding the received response to the first message.

3. The method of claim 1, wherein each of the first and second communication devices is configured to use Network Time Protocol (NTP) for network time synchronization.

4. A method for improving timing accuracy in a network, the method comprising:
   receiving, at a client device, a synchronization message transmitted from a server device at a predetermined time t, wherein the server device is in communication with the client device via the network;
   transmitting, at a time that is earlier than t but not earlier than t−d, from the client device to the server device, a delay request message, wherein d is a delay time interval greater than zero and is based on estimating an amount of time that the server device uses to generate the synchronization message and submit the generated synchronization message to the network;
   receiving, at the client device, a response to the delay request message;
   using the response to calculate a transfer time between the client device and the server device; and
   synchronizing an internal clock of the client device to an internal clock of the server device based on the calculated transfer time.

5. The method of claim 4, wherein each of the client device and the server device is configured to use Precision Time Protocol (PTP) for network time synchronization.

6. A method for improving timing accuracy in a network, the method comprising:
   transmitting, at a time that is earlier than t but not earlier than t−d, from a first client device to each of a server device and a plurality of second client devices, a dummy message;
   transmitting, from the server device, a synchronization message to each of the first and second client devices at a predetermined time t, wherein d is a delay time interval greater than zero and is determined based on estimating an amount of time that the server device uses to generate the synchronization message and submit the generated synchronization message to the network;
   receiving, at the first client device, the synchronization message;
   using the received synchronization message to calculate a transfer time between the first client device and the server device; and
   synchronizing an internal clock of the first client device to an internal clock of the server device based on the calculated transfer time.

7. The method of claim 6, wherein each of the server device and the first and second client devices is configured to use Precision Time Protocol (PTP) for network time synchronization.

8. A method for improving timing accuracy between a server device and a client device, comprising:
   transmitting, at a time t, a first synchronization message from the server device to the client device via a network; and
   transmitting, no later than at a time t+d, a second synchronization message from the server device to the client device via the network,
   wherein d is delay time interval greater than zero that is determined such that the client device is caused to discard the first synchronization message transmitted from the server device to the client device and to use the second synchronization message and not the first synchronization message transmitted from the server device to the client device for calculating a transfer time between the server device and the client device, and wherein an internal clock of the client device is synchronized to an internal clock of the server device based on the calculated transfer time.

9. The method of claim 8, wherein each of the client device and the server device is configured to use Precision Time Protocol (PTP) for network time synchronization.

10. A method for improving timing accuracy in a network, the method comprising:
    estimating a one-way transfer time T for a synchronization message to propagate from a server device to a client device, wherein the server device is in communication with the client device via the network and wherein the server device is configured to transmit a synchronization message to the client device at a predetermined time t;
    determining an interval d such that a cache remains populated for no less time than d, wherein d is an interval greater than zero;
    causing the server device to populate caches stored in the server device prior to t but no earlier than t−d;
    causing the client device to populate caches stored in the client device prior to t+T but no earlier than t+T−d; and
    synchronizing the client device to the server device based on the synchronization message.

11. The method of claim 10, wherein each of the client device and the server device is configured to use Precision Time Protocol (PTP) for network time synchronization.

12. A method for improving timing accuracy in a network, the method comprising:
    receiving, at a client device, a first message, the first message including information indicating a time t at which a second message is to be transmitted by a server device to the client device;
    transmitting, at a time that is earlier than t but not earlier than t−d, from the client device to a network interface device, a polling message, wherein d is a delay time interval greater than zero and is determined based on estimating an amount of time that the server device uses to generate the second message and submit the generated second message to the network, and wherein the server device is in communication with the client device via the network interface device;

receiving, at the client device, the second message;

using the second message to calculate a transfer time between the client device and the server device; and synchronizing an internal clock of the client device to an internal clock of the server device based on the calculated transfer time.

13. The method of claim 12, wherein each of the client device and the server device is configured to use Precision Time Protocol (PTP) for network time synchronization.

* * * * *